Oct. 19, 1937.  F. H. HIGGINS, JR  2,096,638
PLUMB ROD DEVICE
Filed Dec. 10, 1936

Inventor
F. H. Higgins, Jr.
By L. F. Randolph
Attorney

Patented Oct. 19, 1937

2,096,638

UNITED STATES PATENT OFFICE 2,096,638

PLUMB ROD DEVICE

Frank H. Higgins, Jr., Tucson, Ariz.

Application December 10, 1936, Serial No. 115,252

4 Claims. (Cl. 33—46)

This invention relates to a plumb rod device and is designed primarily as a replacement for the conventional plumb bob used on an engineer's transit.

It is aimed to provide a structure which is especially adapted for use in windy weather without objection, although functioning equally well in all kinds of weather. As is well known, plumb bobs cause excessive gyration in windy weather on an engineer's transit. In my construction, the device is capable of transfer to other instruments and without special adjustment.

It is further aimed to provide a novel calibrated level rod for the purpose of indicating the height of the telescope relative to a certain station.

Another object is to provide a novel socket joint enabling ready detachment of the rod from the instrument for use as an auxiliary range pole.

The structure permits an instrument man with another instrument to take a center line on the instrument to which it is attached.

The more specific objects and advantages will become apparent from a consideration of the description following taken in connection with accompanying drawing illustrating an operative embodiment.

In said drawing:—

Figure 1:
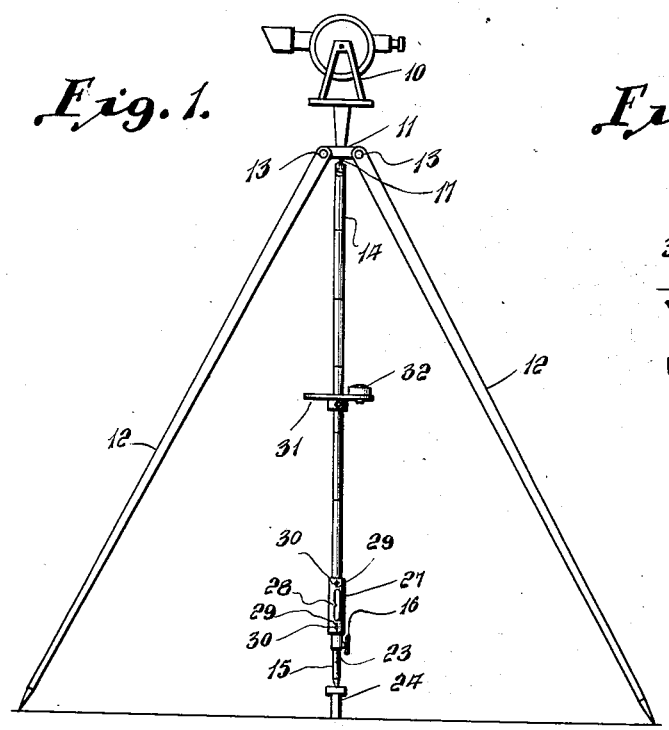
Figure 1 is a view in side elevation showing the invention in use.
Figure 2:
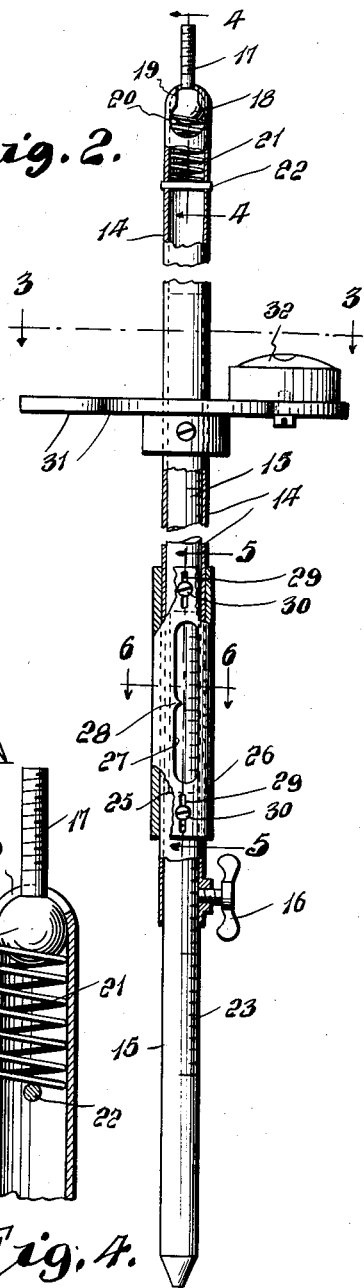
Figure 2 is an enlarged view of the plumb rod device, partly in section and partly broken away to disclose details.
Figures 3, 4, 5, 6:
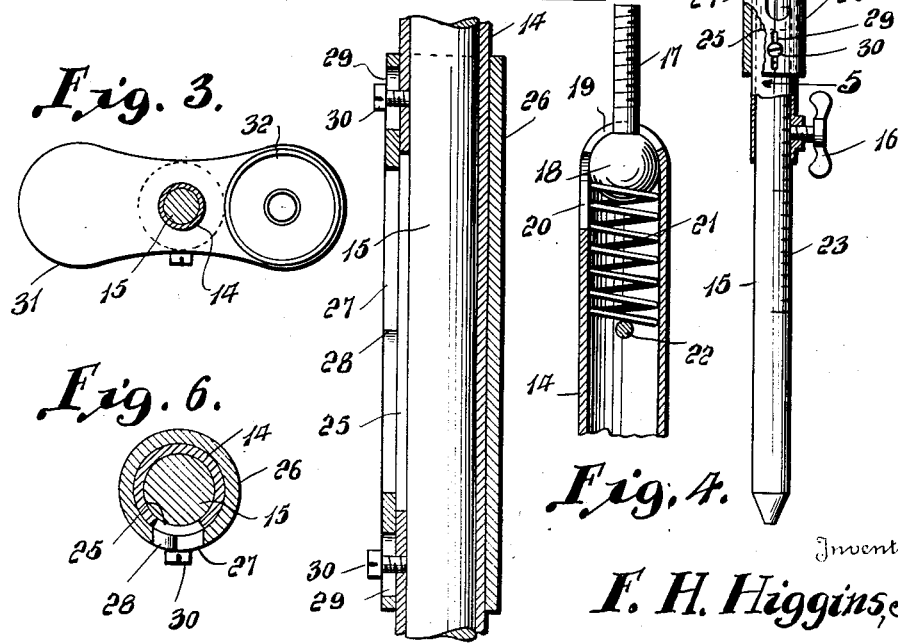
Figure 3 is a detail section taken on the line 3—3 of Figure 2.
Figure 4 is a detail longitudinal section taken on the line 4—4 of Figure 2.
Figure 5 is a vertical section taken on the line 5—5 of Figure 2.
Figure 6 is a cross section taken on the line 6—6 of Figure 2.

Referring specifically to the drawing wherein like reference characters designate like or similar parts, 10 designates a conventional telescope device extending above a table 11 having legs 12 pivotally and foldably connected thereto as at 13.

The plumb rod has a hollow or tubular rod section 14 and a solid rod section 15 adjustably telescoped therein and maintained in different adjustments or positions through the medium of a winged screw 16.

A screw member 17 passes through the table 11 and is detachably screw threaded into the telescope device 10. Such screw member 17 at the lower end has a ball 18 detachably coupled to the upper end of the tube 14 and engageable and disengageable from the tube by providing a slot 19 in the upper end of the tube of substantially the same width as the screw member 17 and by providing in communication with said slot, a slot 20 of substantially the same size as the ball 18. The ball 18 is urged into uppermost position through the medium of an expansive coil spring 21 located within the tube and resting on a cross member 22 therein.

The level rod 15 has suitable calibrations thereon as at 23 reading for instance in feet, tenths of feet and hundredths of feet in an upward direction for the purpose of giving or indicating the height of the telescope above a certain station or location such as that indicated at 24 in Figure 1.

In order that the calibrations 23 may be read, an elongated slot or opening 25 is provided through the tubular rod 14, and adjustably telescoped over the tubular rod 14 is an indicator rod or sleeve 26 which has a longitudinal slot, window or opening 27 registering with that at 25, and into which an indicator 28 extends, which is an integral part of the sleeve 26. Such sleeve 26 is longitudinally slidable on the tubular rod 14 for adjustment and it has elongated slots at 29 through which set screws 30 pass and which are adjustably threaded in openings of the tubular rod 14. The sleeve 26 in effect becomes a part of the rod 14 and the indicator 28 co-acts with the calibrations as they appear opposite the same.

On the rod 14, above the sleeve 26 a bracket 31 is mounted, which mounts on one side of the rod 14, a level vial 32, the other side or end of the bracket 31 being a counterweight. This level vial is preferably of the watch glass type and the counterweight or counterbalance 31 is necessary in the event the operator wishes to allow the rod to swing free so as to assume a vertical position.

In addition to the advantages attained by the structure as hereinbefore described, a further, and, in fact, a primary object of the invention, is the provision of a stationary or fixed object that affords means for erecting a transit at the point desired in the quickest and most expeditious manner. In such use of the device the set screw 16 is loosened to permit rod section 15 to move freely in the tube 14. The transit is then arranged approximately over the mark or monument and the free end of rod section 15 is placed on the mark. The level vial 32 will then show in what direction the transit must be moved to bring it perpendicular to the mark and thus avoid the present practice of tests and trials with a plumb bob to position the instrument.

The socket joint at 18 enables the rod to be easily disconnected from the instrument and used as an auxiliary range pole.

The rods 14 and 15 are preferably made of brass tubing and the ball 18 is preferably made of bronze.

Various changes may be made within the spirit and scope of the invention since it is to be understood that the illustration and specific description relates only to one example or embodiment, it being clear that the invention may equally well be used on transits, levels, plane-tables, other surveying instruments, or the equivalent.

I claim as my invention:—

1. An instrument of the class described having a telescope, a plumb rod device depending therefrom, means having detachable connection between the telescope or the like and the plumb rod device to enable use of the latter as an auxiliary range pole, said means of detachable connection comprising a securing member attached to the telescope and having a ball, the plumb rod device having a part formed with a slot at its one end permitting the quick engagement with and detachment from said ball, spring means carried by the plumb rod device urging said ball into contact with the part, a means on the plumb rod device for taking the reaction thrust of said spring, a bracket on the plumb rod device, a levelling vial on said bracket, said bracket having a counterweight portion on the side of the device opposite to the vial.

2. An instrument of the class described having a telescope, a plumb rod device depending therefrom, means having detachable connection between the telescope or the like and the plumb rod device to enable use of the latter as an auxiliary range pole, said means of detachable connection comprising a securing member attached to the telescope and having a ball, the plumb rod device having a part formed with a slot at its one end permitting the quick engagement with and detachment from said ball, spring means carried by the plumb rod device urging said ball into contact with the part, a means on the plumb rod device for taking the reaction of said spring, a bracket on the plumb rod device, a levelling vial on said bracket, said bracket having a counterweight portion on the side of the device opposite to the vial, said plumb rod device having a tubular section provided with a window opening, a section telescoped in the tubular section having calibrations registrable with the window opening, a sleeve on the tubular section having a window registering with the first mentioned window for reading the calibrations aforesaid through said window opening.

3. An instrument of the class described having a telescope, a plumb rod device depending therefrom, means having detachable connection between the telescope or the like and the plumb rod device to enable use of the latter as an auxiliary range pole, said means of detachable connection comprising a securing member attached to the telescope and having a ball, the plumb rod device having a part formed with a slot at its one end permitting the quick engagement with and detachment from said ball, spring means carried by the plumb rod device urging said ball into contact with the part, a means on the plumb rod device for taking the reaction thrust of said spring, a bracket on the plumb rod device, a levelling vial on said bracket, said bracket having a counterweight portion on the side of the device opposite to the vial, said plumb rod device having a tubular section provided with a window opening, a section telescoped in the tubular section having calibrations registrable with the window opening, a sleeve on the tubular section having a window registering with the first mentioned window for reading the calibrations aforesaid through said window opening, said sleeve having an integral indicator thereon co-acting with the calibrations, said sleeve also having elongated slots therethrough and fastenings passing through said elongated slots and into said tubular rod section.

4. A plumb rod device of the class described comprising a tube, a calibrated rod member slidably adjustable in said tube, said tube having a window opening enabling observation therethrough of the calibrations on the rod, a sleeve surrounding the tube adjustable therealong and having a window registrable with the window opening and bearng an index against which the calibrations upon the rod may be read, said window permitting the reading of the calibrations through said window opening.

FRANK H. HIGGINS, Jr.